US012780236B2

(12) United States Patent
Kozlowski et al.

(10) Patent No.: US 12,780,236 B2
(45) Date of Patent: Nov. 3, 2026

(54) METHOD TO PROVIDE AND SUPPRESS ALERTS AND INTERVENTIONS FOR VEHICLES

(71) Applicant: GM GLOBAL TECHNOLOGY OPERATIONS LLC, Detroit, MI (US)

(72) Inventors: William L. Kozlowski, Novi, MI (US); Paul A. Adam, Milford, MI (US); Alexander Gene Rath, Fenton, MI (US); Jeffrey S. Parks, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 42 days.

(21) Appl. No.: 18/948,581

(22) Filed: Nov. 15, 2024

(65) Prior Publication Data

US 2026/0138633 A1 May 21, 2026

(51) Int. Cl.

| | |
|---|---|
| ***B60W 30/12*** | (2020.01) |
| ***B60W 50/10*** | (2012.01) |
| ***B60W 50/12*** | (2012.01) |
| ***B60W 50/16*** | (2020.01) |
| *B60W 50/14* | (2020.01) |

(52) U.S. Cl.

CPC ............ *B60W 50/16* (2013.01); *B60W 30/12* (2013.01); *B60W 50/10* (2013.01); *B60W 50/12* (2013.01); *B60W 2050/143* (2013.01); *B60W 2050/146* (2013.01); *B60W 2420/408* (2024.01); *B60W 2510/202* (2013.01)

(58) Field of Classification Search

CPC ...... B60W 50/16; B60W 30/12; B60W 50/10; B60W 50/12; B60W 2050/143; B60W 2050/146; B60W 2420/408; B60W 2510/202

See application file for complete search history.

(56) References Cited

U.S. PATENT DOCUMENTS

| | | | | |
|---|---|---|---|---|
| 8,818,682 | B1 * | 8/2014 | Dolgov ................ | G05D 1/0055 340/901 |
| 10,249,195 | B2 * | 4/2019 | Sim ........................ | G08G 1/167 |

(Continued)

FOREIGN PATENT DOCUMENTS

| | | | |
|---|---|---|---|
| DE | 102005018688 | A1 | 10/2006 |
| DE | 102007046688 | A1 | 4/2009 |
| DE | 102015217783 | A1 | 3/2017 |

*Primary Examiner* — Nay Tun

(74) *Attorney, Agent, or Firm* — Ingrassia Fisher & Lorenz, LLP | IFL

(57) ABSTRACT

Methods and systems are provided that include first and second sensors and a processor of a vehicle. The first sensors obtains first sensor data as to movement of the vehicle from its current path or lane. The second sensors obtain second sensor data as to an intended maneuver of a driver of the vehicle. The processor at least facilitates determining whether the intended maneuver of the driver is consistent with the movement of the vehicle from its current path or lane; providing corrective actions based on the movement when it is determined that the intended maneuver of the driver is not consistent with the movement of the vehicle from its current path or lane; and suppressing the one or more corrective actions when it is determined that the intended maneuver of the driver is consistent with the movement of the vehicle from its current path or lane.

10 Claims, 7 Drawing Sheets

(56) References Cited

U.S. PATENT DOCUMENTS

| | | | | | |
|---|---|---|---|---|---|
| 10,272,838 | B1 * | 4/2019 | Pertsel | B60Q 5/005 | |
| 10,449,967 | B1 * | 10/2019 | Ferguson | G08G 1/0129 | |
| 12,115,964 | B1 * | 10/2024 | Hawley | B60W 30/18163 | |
| 12,263,838 | B2 * | 4/2025 | Itazuri | B60W 50/14 | |
| 2008/0033614 | A1 * | 2/2008 | Schiehlen | B62D 15/0265 | 701/41 |
| 2008/0204212 | A1 * | 8/2008 | Jordan | B60Q 1/52 | 340/475 |
| 2009/0091435 | A1 * | 4/2009 | Bolourchi | B60K 28/066 | 340/575 |
| 2012/0271539 | A1 * | 10/2012 | Bald | G08G 1/167 | 701/300 |
| 2013/0085976 | A1 * | 4/2013 | Bone | B60W 30/18163 | 706/46 |
| 2015/0235140 | A1 * | 8/2015 | Rothermel | B60W 30/18163 | 706/52 |
| 2016/0016584 | A1 * | 1/2016 | Pfeiffer | B60W 30/16 | 701/34.1 |
| 2018/0273089 | A1 * | 9/2018 | Isomoto | G05D 1/0246 | |
| 2021/0394775 | A1 * | 12/2021 | Julian | B60W 50/14 | |
| 2022/0024452 | A1 * | 1/2022 | Ohwada | G08B 25/006 | |
| 2023/0055183 | A1 * | 2/2023 | Itazuri | B60W 50/14 | |
| 2023/0339463 | A1 * | 10/2023 | Fuess | B60W 30/12 | |
| 2024/0017749 | A1 * | 1/2024 | Um | B60W 30/08 | |
| 2024/0067267 | A1 * | 2/2024 | Uchida | B60Q 9/00 | |
| 2024/0375674 | A1 * | 11/2024 | Kume | B60K 35/10 | |

* cited by examiner

METHOD TO PROVIDE AND SUPPRESS ALERTS AND INTERVENTIONS FOR VEHICLES

INTRODUCTION

The technical field generally relates to vehicles and, more specifically, to methods and systems for providing and suppressing vehicle alerts and interventions based on whether they are deemed to be necessary.

Certain vehicles today have control systems that provide alerts and interventions, including for lane keeping assist and lane departure warning for vehicles. However, in some situations such alerts and interventions may not be necessary.

Accordingly, it is desirable to provide improved methods and systems for providing and suppressing vehicle alerts and interventions based on whether they are deemed to be necessary. Furthermore, other desirable features and characteristics of the present disclosure will become apparent from the subsequent detailed description and the appended claims, taken in conjunction with the accompanying drawings and the foregoing technical field and background.

SUMMARY

In an exemplary embodiment, a method is provided that includes obtaining, via one or more first sensors of a vehicle, first sensor data as to movement of the vehicle from its current path or lane; obtaining, via one or more second sensors of the vehicle, second sensor data as to an intended maneuver of a driver of the vehicle; determining, via a processor of the vehicle, whether the intended maneuver of the driver is consistent with the movement of the vehicle from its current path or lane; providing, via instructions provided by the processor, one or more corrective actions based on the movement, when it is determined that the intended maneuver of the driver is not consistent with the movement of the vehicle from its current path or lane; and suppressing, via the instructions provided by the processor, the one or more corrective actions, when it is determined that the intended maneuver of the driver is consistent with the movement of the vehicle from its current path or lane.

Also in an exemplary embodiment, the step of providing the one or more corrective actions includes providing, via the instructions provided by the processor, a warning for the driver as part of a lane departure warning functionality for the vehicle, when it is determined that the intended maneuver of the driver is not consistent with the movement of the vehicle from its current path or lane; and the step of suppressing the one or more corrective actions includes not providing the warning, via the instructions provided by the processor, when it is determined that the intended maneuver of the driver is consistent with the movement of the vehicle from its current path or lane.

Also in an exemplary embodiment, the step of providing the one or more corrective actions includes providing, via the instructions provided by the processor to a steering system of the vehicle, counter-steering torque as part of a lane keeping assist functionality for the vehicle, when it is determined that the intended maneuver of the driver is not consistent with the movement of the vehicle from its current path or lane; and the step of suppressing the one or more corrective actions includes not providing the counter-steering torque, via the instructions provided by the processor, when it is determined that the intended maneuver of the driver is consistent with the movement of the vehicle from its current path or lane.

Also in an exemplary embodiment, the intended maneuver of the driver includes avoiding one or more other detected vehicles that are encroaching upon the vehicle; and the step of determining whether the intended maneuver of the driver is consistent with the movement of the vehicle from its current path includes determining whether the intended maneuver for avoiding the one or more other detected vehicles is consistent with the movement of the vehicle from its current path.

Also in an exemplary embodiment, the intended maneuver of the driver includes overtaking one or more other detected vehicles; and the step of determining whether the intended maneuver of the driver is consistent with the movement of the vehicle from its current path includes determining whether the intended maneuver for overtaking the one or more other detected vehicles is consistent with the movement of the vehicle from its current path.

Also in an exemplary embodiment, the intended maneuver of the driver includes turning into a new lane on a roadway; and the step of determining whether the intended maneuver of the driver is consistent with the movement of the vehicle from its current path includes determining whether the intended maneuver for turning into the new lane on the roadway is consistent with the movement of the vehicle from its current path.

Also in an exemplary embodiment, the intended maneuver of the driver includes merging with an adjacent lane; and the step of determining whether the intended maneuver of the driver is consistent with the movement of the vehicle from its current path includes determining whether the intended maneuver for merging with the adjacent lane is consistent with the movement of the vehicle from its current path.

Also in an exemplary embodiment, the intended maneuver of the driver includes proceeding in accordance with a navigation system route; and the step of determining whether the intended maneuver of the driver is consistent with the movement of the vehicle from its current path includes determining whether the intended maneuver for proceeding in accordance with the navigation system route is consistent with the movement of the vehicle from its current path.

Also in an exemplary embodiment, the intended maneuver of the driver includes maneuvering from a current lane that is ending; and the step of determining whether the intended maneuver of the driver is consistent with the movement of the vehicle from its current path includes determining whether the intended maneuver for maneuvering from the current lane that is ending is consistent with the movement of the vehicle from its current path.

In another exemplary embodiment, a system is provided that includes one or more sensors of a vehicle, one or more second sensors of the vehicle, and a processor. The one or more first sensors of a vehicle are configured to obtain first sensor data as to movement of the vehicle from its current path or lane. The one or more second sensors of the vehicle are configured to obtain second sensor data as to an intended maneuver of a driver of the vehicle. The processor that is coupled to the one or more first sensors and to the one or more second sensors, and that is configured to at least facilitate determining whether the intended maneuver of the driver is consistent with the movement of the vehicle from its current path or lane; providing, via instructions provided by the processor, one or more corrective actions based on the movement, when it is determined that the intended maneuver of the driver is not consistent with the movement of the vehicle from its current path or lane; and suppressing, via the instructions provided by the processor, the one or more corrective actions, when it is determined that the intended maneuver of the driver is consistent with the movement of the vehicle from its current path or lane.

Also in an exemplary embodiment the processor is further configured to at least facilitate providing the one or more corrective actions by providing, via the instructions provided by the processor, a warning for the driver as part of a lane departure warning functionality for the vehicle, when it is determined that the intended maneuver of the driver is not consistent with the movement of the vehicle from its current path or lane; and suppressing the one or more corrective actions by not providing the warning, via the instructions provided by the processor, when it is determined that the intended maneuver of the driver is consistent with the movement of the vehicle from its current path or lane.

Also in an exemplary embodiment, the processor is further configured to at least facilitate providing the one or more corrective actions by providing, via the instructions provided by the processor to a steering system of the vehicle, counter-steering torque as part of a lane keeping assist functionality for the vehicle, when it is determined that the intended maneuver of the driver is not consistent with the movement of the vehicle from its current path or lane; and suppressing the one or more corrective actions by not providing the counter-steering torque, via the instructions provided by the processor, when it is determined that the intended maneuver of the driver is consistent with the movement of the vehicle from its current path or lane.

Also in an exemplary embodiment, the intended maneuver of the driver includes avoiding one or more other detected vehicles that are encroaching upon the vehicle; and the processor is further configured to at least facilitate determining whether the intended maneuver of the driver is consistent with the movement of the vehicle from its current path based on whether the intended maneuver for avoiding the one or more other detected vehicles is consistent with the movement of the vehicle from its current path.

Also in an exemplary embodiment, the intended maneuver of the driver includes overtaking one or more other detected vehicles; and the processor is further configured to at least facilitate determining whether the intended maneuver of the driver is consistent with the movement of the vehicle from its current path based on whether the intended maneuver for overtaking the one or more other detected vehicles is consistent with the movement of the vehicle from its current path.

Also in an exemplary embodiment, the intended maneuver of the driver includes turning into a new lane on a roadway; and the processor is further configured to at least facilitate determining whether the intended maneuver of the driver is consistent with the movement of the vehicle from its current path based on whether the intended maneuver for turning into the new lane on the roadway is consistent with the movement of the vehicle from its current path.

Also in an exemplary embodiment, the intended maneuver of the driver includes merging with an adjacent lane; and the processor is further configured to at least facilitate determining whether the intended maneuver of the driver is consistent with the movement of the vehicle from its current path based on whether the intended maneuver for merging with the adjacent lane is consistent with the movement of the vehicle from its current path.

Also in an exemplary embodiment, the intended maneuver of the driver includes proceeding in accordance with a navigation system route; and the processor is further configured to at least facilitate determining whether the intended maneuver of the driver is consistent with the movement of the vehicle from its current path based on whether the intended maneuver for proceeding in accordance with the navigation system route is consistent with the movement of the vehicle from its current path.

Also in an exemplary embodiment, the intended maneuver of the driver includes maneuvering from a current lane that is ending; and the processor is further configured to at least facilitate determining whether the intended maneuver of the driver is consistent with the movement of the vehicle from its current path based on whether the intended maneuver for maneuvering from the current lane that is ending is consistent with the movement of the vehicle from its current path.

In another exemplary embodiment, a vehicle is provided that includes a body, a drive system, a steering system, one or more steering sensors, one or more radar sensors, one or more cameras, and a processors. The drive system is configured to move the body, and includes an accelerator pedal. The steering system is configured to steer the vehicle. The one or more steering sensors are configured to obtain first sensor data as to movement of the vehicle from its current path or lane. The one or more radar sensors and the one or more cameras are configured to obtain second sensor data as to an intended maneuver of a driver of the vehicle. The processor is coupled to the one or more steering sensors, the one or more radar sensors, and the one or more cameras, and is configured to at least facilitate determining whether the intended maneuver of the driver is consistent with the movement of the vehicle from its current path or lane; providing, via instructions provided by the processor, corrective actions based on the movement, including a warning for the driver as part of a lane departure warning functionality for the vehicle, and further including counter-steering torque as part of a lane keeping assist functionality for the vehicle, when it is determined that the intended maneuver of the driver is not consistent with the movement of the vehicle from its current path or lane; and suppressing, via the instructions provided by the processor, the corrective actions, including the warning for the driver and the counter-steering torque, when it is determined that the intended maneuver of the driver is consistent with the movement of the vehicle from its current path or lane.

Also in an exemplary embodiment, the processor is further configured to at least facilitate suppressing the corrective actions, including the warning for the driver and the counter-steering torque, when one or more of the following conditions are satisfied: an intended maneuver for avoiding one or more other detected vehicles is consistent with the movement of the vehicle from its current path; an intended maneuver for overtaking the one or more other detected vehicles is consistent with the movement of the vehicle from its current path; an intended maneuver for turning into a new lane on a roadway is consistent with the movement of the vehicle from its current path; an intended maneuver for merging with an adjacent lane is consistent with the movement of the vehicle from its current path; an intended maneuver for proceeding in accordance with a navigation system route is consistent with the movement of the vehicle from its current path; and an intended maneuver for maneuvering from a current lane that is ending is consistent with the movement of the vehicle from its current path.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
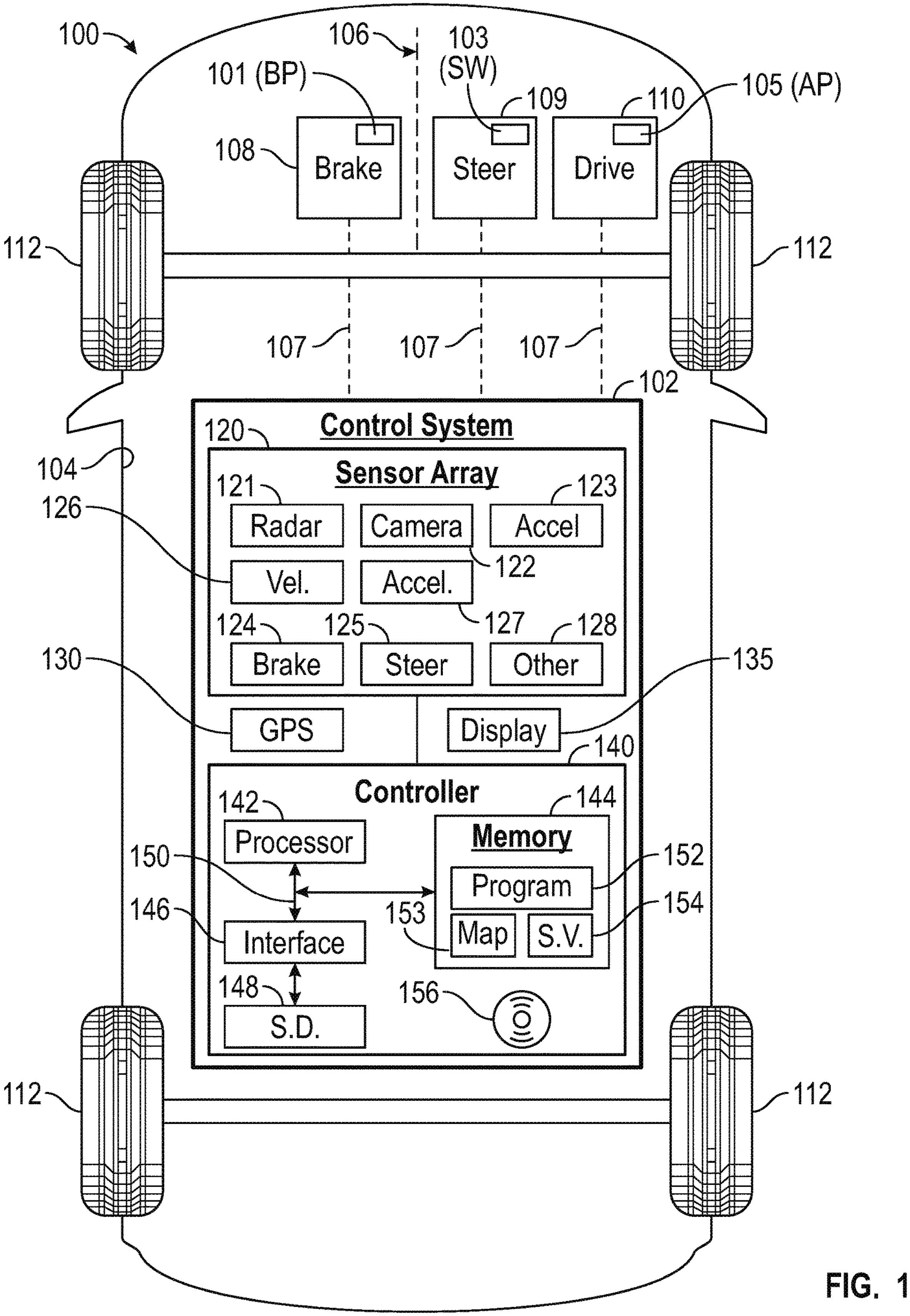
FIG. 1 is a functional block diagram of a vehicle that includes a control system for providing and suppressing vehicle alerts and interventions based on whether they are deemed to be necessary, in accordance with exemplary embodiments.

FIG. 1 illustrates a vehicle 100 (also referred to herein as a "host vehicle" 100), according to an exemplary embodiment. As described in greater detail further below, the vehicle 100 includes a control system 102 that is configured for providing and suppressing vehicle alerts and interventions based on whether they are deemed to be necessary, in accordance with exemplary embodiments.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In certain embodiments, the vehicle 100 is configured to be driven by a human driver. Also in various embodiments, the control system 102 provides warning and interventions (e.g., lane departure warning and lane keep assist functionality) for the drive in appropriate circumstances, and also suppresses such warnings and interventions in particular situations when they are deemed to not be necessary (including when the driver of the vehicle 100 is deemed to be controlling a vehicle maneuver at issue intentionally for a particular reason, such as to avoid another vehicle, change lanes, merge with traffic, and so on, as described in greater detail further below).

The vehicle 100 includes a body 104 that is arranged on a chassis 106. The body 104 substantially encloses other components of the vehicle 100. The body 104 and the chassis 106 may jointly form a frame. The vehicle 100 also includes a plurality of wheels 112. The wheels 112 are each rotationally coupled to the chassis 106 near a respective corner of the body 104 to facilitate movement of the vehicle 100. In one embodiment, the vehicle 100 includes four wheels 112, although this may vary in other embodiments (for example for trucks and certain other vehicles).

As depicted in FIG. 1, the vehicle includes a braking system 108 in various embodiments. In exemplary embodiments, the braking system 108 controls braking of the vehicle 100 using braking components that are controlled via inputs provided by a driver (e.g., via a brake pedal 101 in certain embodiments).

In exemplary embodiments, the vehicle 100 also includes a steering system 109 that controls steering of the vehicle 100. In various embodiments, the steering system 109 controls steering of the vehicle 100 via steering components, for example that including a steering column that is coupled to the axles 114 and/or the wheels 112, and that is controlled via inputs provided by a driver via a steering wheel 103.

Also in exemplary embodiments, a drive system 110 is mounted on the chassis 106, and drives the wheels 112, for example via axles 114. In certain embodiments, the drive system 110 comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. Also in exemplary embodiments, the drive system 110 controls propulsion of the vehicle 100 in accordance with via inputs provided by a driver (e.g., via an accelerator pedal 105).

In the embodiment depicted in FIG. 1, the control system 102 is coupled to the steering system 109, the braking system 108, and/or the drive system 110. In various embodiments, the control system 102 is coupled to the steering system 109, the braking system 108, and the drive system 110 via one or more communications link 107, such as a vehicle CAN bus in one embodiments. In certain embodiments, the control system 102 may also be coupled to one or more other vehicle systems and/or components.

In various embodiments, as noted above, the control system 102 determines when warnings and interventions are required, and when they should be suppressed, for the driver of the vehicle. In particular, in various embodiments, the control system 102 detects movement of the vehicle 100 for situations in which warnings and interventions may be appropriate (e.g., to provide a warning and/or countersteering torque when the vehicle 100 may be veering from a current lane), as well as sensor data pertaining to the driver's intent for situations in which such warnings and interventions should be suppressed (e.g., when the vehicle 100 movement is an intentional maneuver by the driver to avoid another vehicle or changes lanes, and so on), including as described in greater detail further below.

As depicted in FIG. 1, in various embodiments, the control system 102 includes a sensor array 120, a location system 130, a display system 135, and a controller 140, as described in greater detail below.

In various embodiments, the sensor array 120 includes various sensors that obtain sensor data as to the vehicle 100, other vehicles and other objects in proximity to the vehicle 100, and for use in preventing contact between the vehicle 100 and the other vehicles and other objects. In the depicted embodiment, the sensor array 120 includes one or more radar sensors 121, cameras 122, accelerator pedal sensors 123, braking sensors 124, steering sensors 125, speed (or velocity) sensors 126, and accelerometers 127. In certain embodiments, the sensor array 120 may also include one or more other sensors 128.

In an exemplary embodiments, the one or more radar sensors 121 obtain radar sensor data as to one or more other vehicles in proximity to the vehicle 100. In certain embodiments, the radar sensors 121 also obtain radar sensor data as to one or more other vehicles, pedestrians, and objects in proximity to the vehicle 100.

In an exemplary embodiments, the one or more cameras 122 obtain camera sensor data as to one or more other vehicles in proximity to the vehicle 100. In certain embodiments, the cameras 122 also obtain camera sensor data as to one or more other vehicles, pedestrians, and objects in proximity to the vehicle 100.

In an exemplary embodiment, the one or more accelerator pedal sensors 123 obtain accelerator sensor data as to a driver's acceleration inputs and engagement of the drive system 110, including the driver's engagement of the accelerator pedal 105 in various embodiments.

In an exemplary embodiment, the one or more braking sensors 124 obtain braking sensor data as to a driver's braking inputs and engagement of the braking system 108, including the driver's engagement of the brake pedal 101 in various embodiments.

In an exemplary embodiment, the one or more steering sensors 125 obtain steering sensor data as to a driver's steering inputs and engagement of the steering system 109, including the driver's engagement of the steering wheel 103 in various embodiments, and/or in certain embodiments an angular position and/or movement of the steering wheel 103 and/or one or more wheels 112 of the vehicle 100.

In certain embodiments, the one or more speed sensors 126 measure a speed and/or velocity of the vehicle 100. In certain embodiments, the speed sensors 126 comprise one or more wheel speed sensors coupled to one or more respective wheels 112 of the vehicle 100.

In various embodiments, the one or more accelerometers 127 measure an acceleration of the vehicle 100.

In addition, in certain embodiments, the sensor array 120 may also include one or more other sensors 128, such as one or more other types of input sensors (e.g., one or more buttons, switches, touch screen display sensors, or other sensors for a driver to provide inputs to request assistance from the control system), and/or one or more other types of detection sensors (e.g., sonar, Lidar, ultrasonic sensors, and the like) for detecting other vehicles and other objects, and so on.

In various embodiments, the location system 130 is configured to determine and track a location of the vehicle 100, including a geographic location that includes longitude and latitude for the vehicle 100 as the vehicle 100 is travelling. In certain embodiments, the location system 130 comprises a satellite-based location system, such as part of a navigation system of the vehicle 100. In certain embodiments, the location system 130 comprises a global position system (GPS).

In various embodiments, the display system 135 is configured to provide one or more warnings (also referred to herein as one or more alerts, notifications, and the like) for the driver with respect to movement of the vehicle 100 (e.g., when the vehicle 100 is drifting out of a center of a current lane of travel, in certain embodiments, when not intended by the driver). In various embodiments, the display system 135 provides the warnings in accordance with instructions provided thereto by the processor 142. In various embodiments, the display system 135 may include, among other possible components: (i) a visual component (e.g., including a display screen) that provides a visual warning for the driver; (ii) an audio component (e.g., including a speaker) that provides an audio warning for the driver; and/or (iii) a haptic component that provides one or more haptic warnings for the driver (e.g., by vibrating a seat of the driver).

In various embodiments, the controller 140 is coupled to the sensor array 120, the location system 130, and the display system 136. In certain embodiments, the controller 140 is also coupled to the braking system 108, the steering system 109, and the drive system 110. In various embodiments, the controller 140 may also be coupled to one or more other vehicle systems. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) provides, among other functionality, control of providing (and when appropriate suppressing) warnings and interventions for the driver, including lane departure warning and lane keep assistance features for the driver of the vehicle 100, and including as described in greater detail further below. In various embodiments, the controller 140 provides these and other functions in accordance with the steps of the process 200 of FIGS. 2 and 3 and implementations of FIGS. 4-9.

In various embodiments, the controller 140 (and, in certain embodiments, the control system 102 itself) is disposed within the body 104 of the vehicle 100. In one embodiment, the control system 102 is mounted on the chassis 106. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIGS. 2 and 3 and implementations of FIGS. 4-9.

The memory 144 can be any type of suitable memory. For example, the memory 144 may include various types of dynamic random access memory (DRAM) such as synchronous dynamic random access memory (SDRAM), the various types of static RAM (SRAM), and the various types of non-volatile memory, such as programmable read-only memory (PROM) and flash. In certain examples, the memory 144 is located on and/or co-located on the same computer chip as the processor 142. In the depicted embodiment, the memory 144 stores the above-referenced program 152 along with map databases 153 (e.g., of geographic locations through which the vehicle 100 may travel) and other stored values 154 (e.g., threshold values for the process 200 of FIGS. 2 and 3 and implementations of FIGS. 4-9 in various embodiments).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 discussed further below in connection with FIGS. 2 and 3 and the implementations of FIGS. 4-9. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
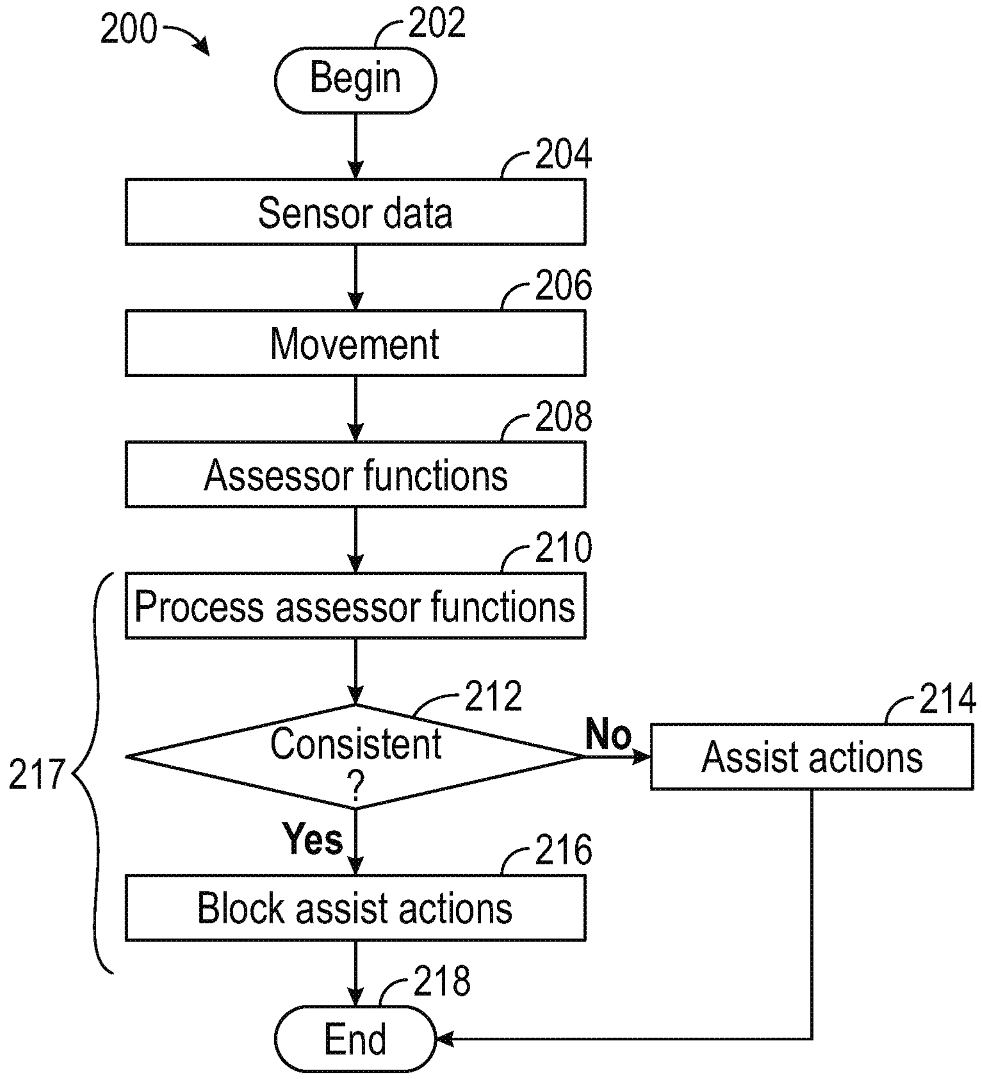
FIG. 2 is a flowchart of a process for providing and suppressing vehicle alerts and interventions based on whether they are deemed to be necessary, and that can be implemented in connection with the vehicle of FIG. 1 and the control system thereof, in accordance with exemplary embodiments.

FIG. 2 is a flowchart of a process 200 for providing and suppressing vehicle alerts and interventions based on whether they are deemed to be necessary, in accordance with exemplary embodiments. Also in various embodiments, the process 200 can be implemented in connection with the vehicle 100 of FIG. 1, including the control system 102 of FIG. 1, and components thereof.

As depicted in FIG. 2, in various embodiments, the process 200 begins at step 202. In one embodiment, the process 200 begins when a vehicle drive or ignition cycle begins, for example when a driver enters the vehicle for operation of the vehicle, and/or when the vehicle 100 is currently being operated by the driver (e.g., as detected one or more of the sensors of the sensor array 120 of FIG. 1 in certain embodiments). In one embodiment, the steps of the process 200 are performed continuously during operation of the vehicle.

In various embodiments, sensor data is obtained (step 204). In various embodiments, the sensor data is obtained from various sensors of the sensor array 120 of FIG. 1, such as one or more radar sensors 121, cameras 122, accelerator pedal sensors 123, braking sensors 124, steering sensors 125, speed sensors 126, accelerometers 127, and other sensors 128 as described in connection with the sensor array 120 of FIG. 1.

In various embodiments, movements of the vehicle 100 are determined (step 206). In various embodiments, movements of the vehicle 100 are determined via the processor 142 of FIG. 1 based on the sensor data obtained via the sensor array 120 in step 204. In various embodiments, the movements determined in step 206 include movements in which the vehicle 100 drifts out of its current lane of travel, such that a warning or intervention may be warranted. In various embodiments, the draft of the vehicle 100 is determined based either directly on movement of the vehicle 100 (e.g., as obtained via one or more steering sensors 125 of FIG. 1 and/or one or more other sensors of the sensor array 120).

Figure 4:
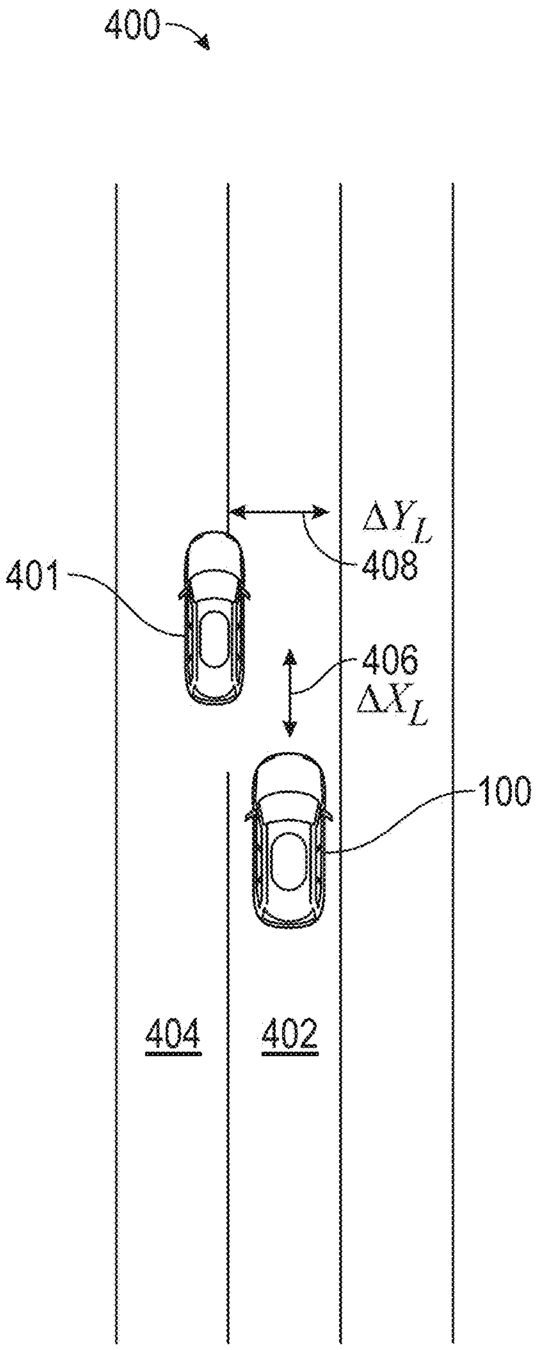
FIGS. 4-9 depict exemplary implementations of the process of FIG. 2 and the subroutine of FIG. 3, in accordance with exemplary embodiments.
Figure 5:
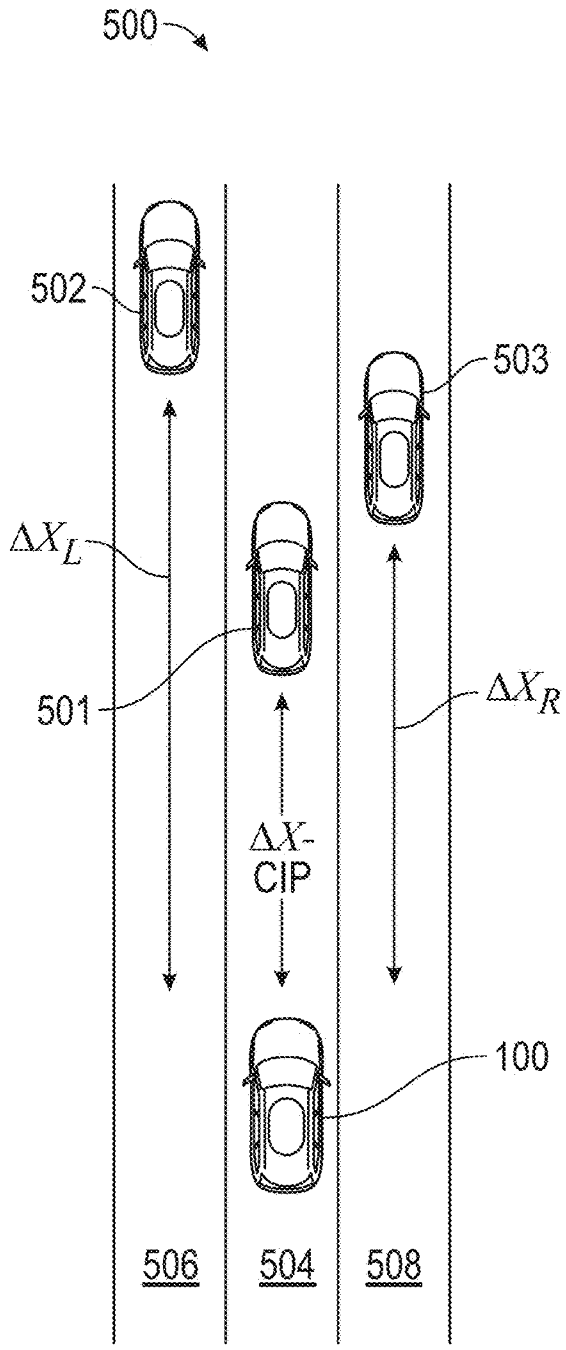
Figure 6:
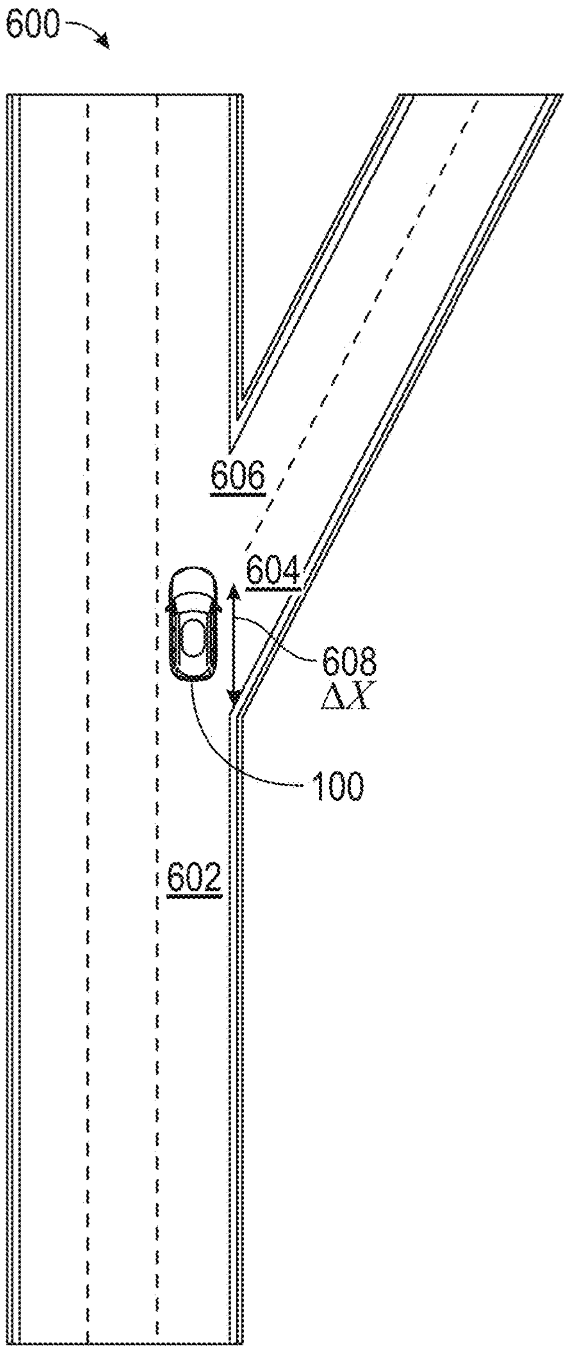
Figure 7:
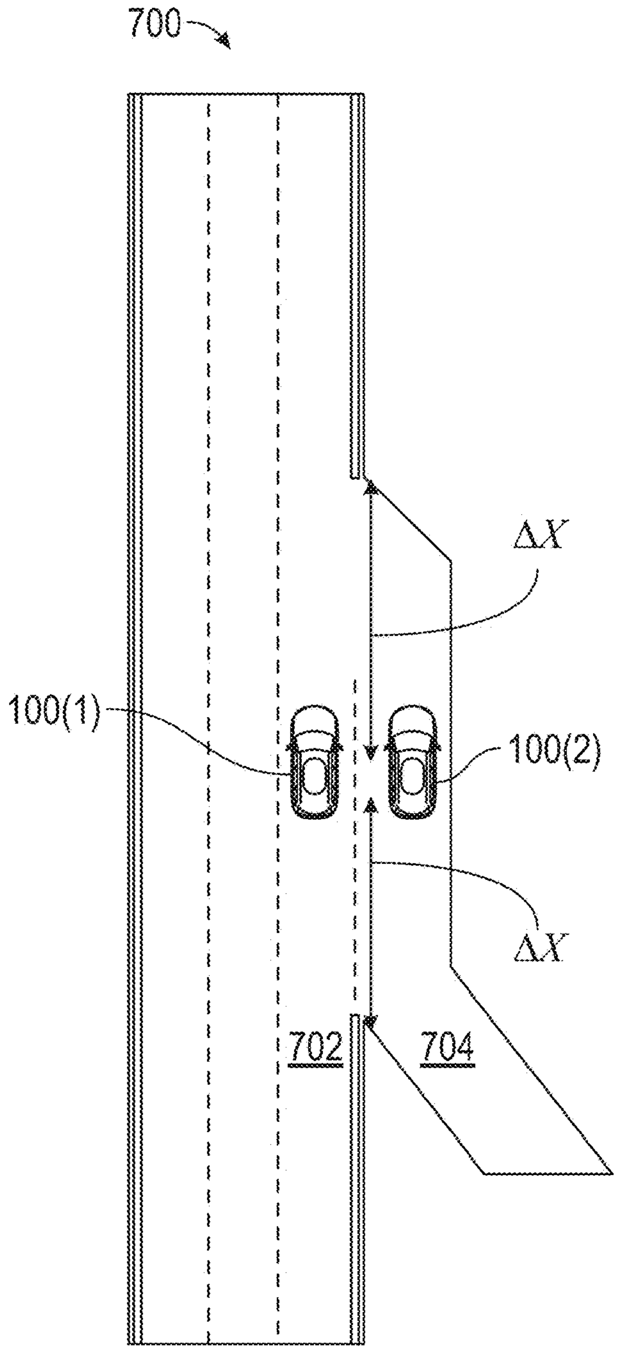
Figure 8:
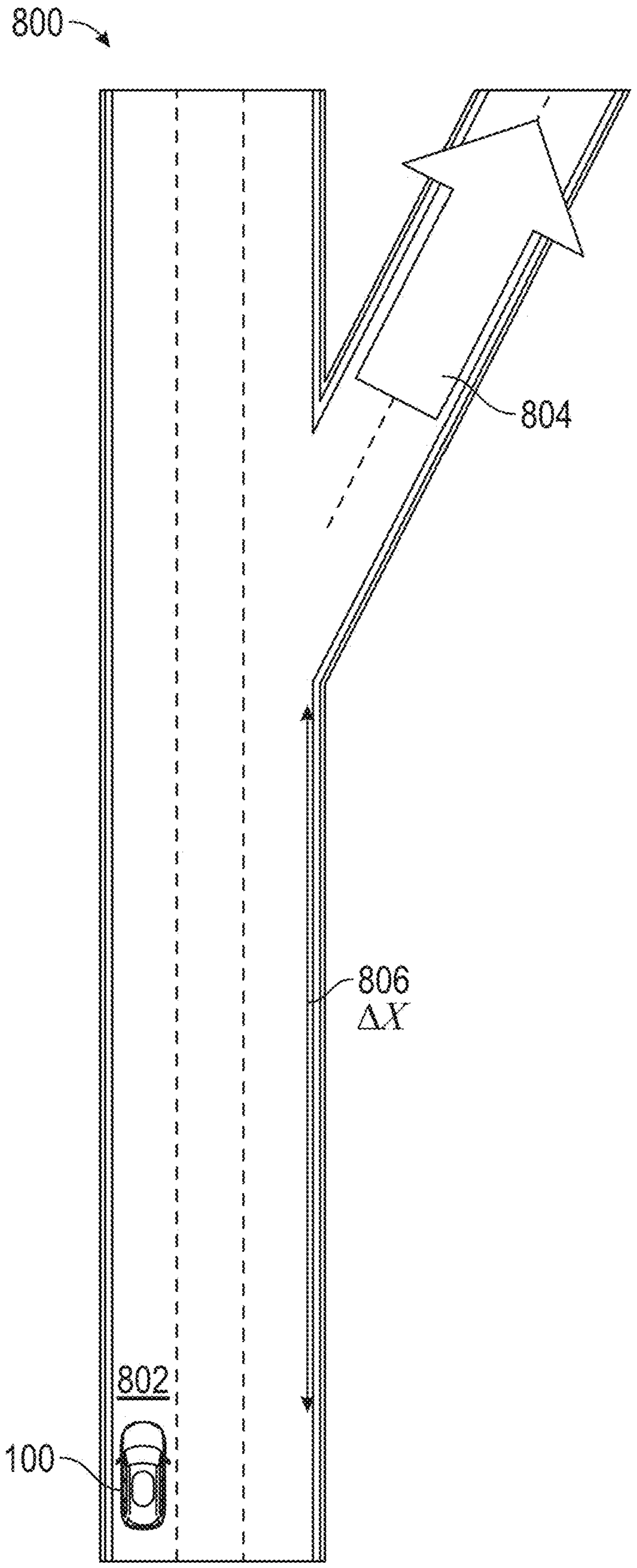
Figure 9:
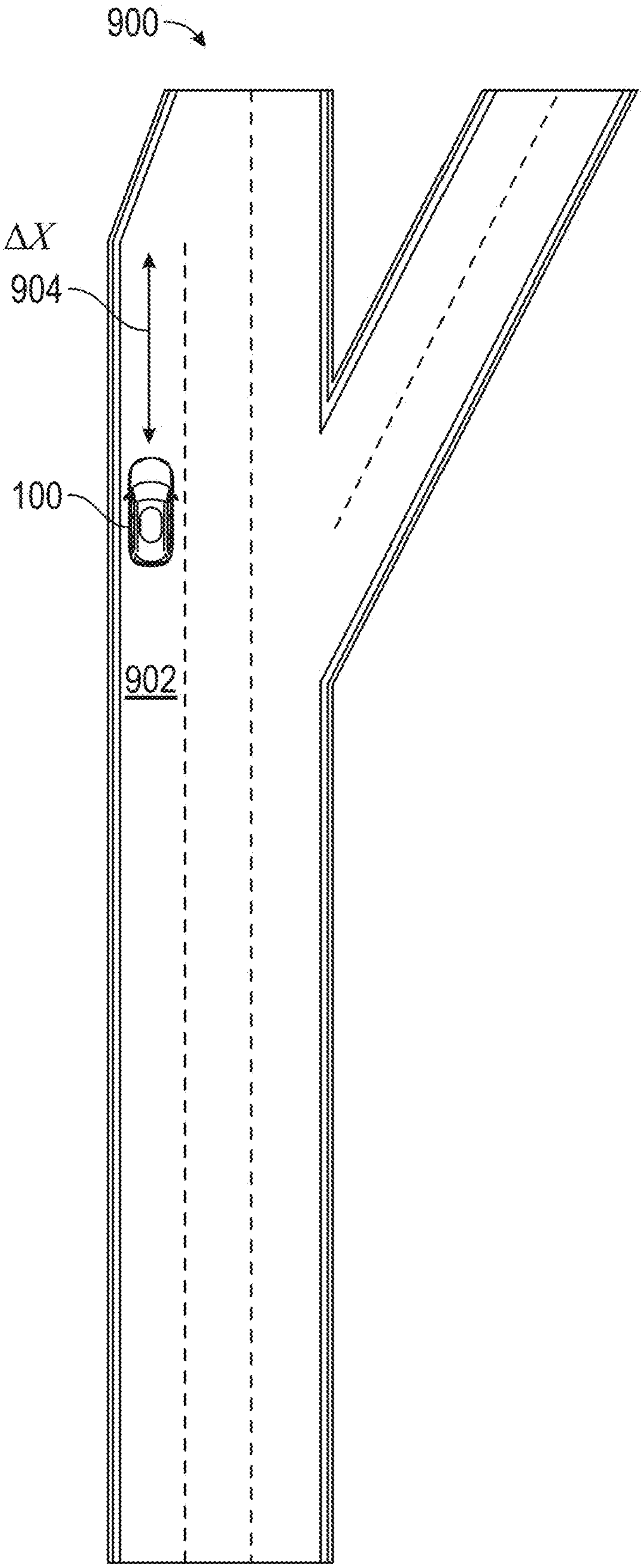

Also in various embodiments, assessor functions are performed (step 208). Specifically, in various embodiments, a plurality of assessor functions are performed by the processor 142 of FIG. 1, using the sensor data of step 204, as to whether there are justifications behind the movements of step 206 that would indicate that the driver has intentionally caused one or more vehicle maneuvers to cause these movements. For example, in various embodiments, during step 208, the processor 142 utilizes sensor data such as driver inputs (e.g., from accelerator pedal sensors 123, braking sensors 124, and steering sensors 125 of FIG. 1) along with detection data as to nearby vehicles and/or other objects (e.g., from radar sensors 121, cameras 122, and/or other detection sensors of the other sensors 128 of FIG. 1) to determine whether the driver is intentionally performing such a maneuver. In various embodiments, such intentional maneuvers make include, among others, (i) avoiding encroachment of other vehicles (e.g., as depicted in FIG. 4 and described further below in connection therewith); (ii) overtaking one or more other vehicles (e.g., as depicted in FIG. 5 and described further below in connection therewith); (iii) turning into a new lane on a roadway, such as a freeway exit ramp (e.g., as depicted in FIG. 6 and described further below in connection therewith); (iv) merging with an adjacent lane (e.g., as depicted in FIG. 7 and described further below in connection therewith); (v) proceeding in accordance with a navigation system route (e.g., as depicted in FIG. 8 and described further below in connection therewith); and (vi) maneuvering from a current lane that is ending (e.g., as depicted in FIG. 9 and described further below in connection therewith).

In various embodiments, the various assessor functions of step 208 are further processed (step 210). Specifically, in various embodiments, the processor 142 determines whether any of the maneuvers associated with the assessor functions of step 208 are likely be currently taken by the driver.

In various embodiments, a determination is made during step 212 as to whether the any of the maneuvers of steps 210-212 are consistent with the vehicle movement of step 206. Specifically, in various embodiments, the processor 142 determines whether any of the intentionally movements believed to be occurring based on the determinations of steps 210-212 (e.g. vehicle 100 movement to the right to avoid another vehicle or to turn into a new lane such as an exit off-ramp to the ramp, and so on) is in the same direction of and is otherwise consistent with the detected vehicle movement of step 206 (e.g., the vehicle 100 moving to the right of the current position in the current lane of travel, and so on).

In various embodiments, if it is determined in step 212 that the maneuvers are not consistent, then one or more assistance actions are taken (step 214). Specifically, in various embodiments, if it is determined that the vehicle movements are deemed to be inconsistent with (and thereby not likely to be caused by) intentional driver actions and associated vehicle maneuvers, then in various embodiments the processor 142 provides instructions for one or more warnings or interventions to be provided for the driver of the vehicle 100. In certain embodiments, the processor 142 provides instructions for the display system 135 to provide one or more warnings for the driver (e.g., one or more visual, audio, and/or haptic warnings) that are then implemented via the display system 135 (e.g., by providing lane departure warning or lane departure alert for the driver). Also in certain embodiments, the processor 142 also provides instructions for the steering system 109 to provide intervention by providing counter-steering torque to help keep the vehicle 100 centered in its current lane of travel, which are then implemented by the steering system 109 (e.g., by providing lane keeping assistance in certain embodiments). In certain embodiments, one or more other types of interventions may similarly be implemented (e.g., via braking through the braking system 108, acceleration via the drive system 110) in accordance with instructions provided thereby by the processor 142, and so on.

Conversely, also in various embodiments, if it is instead determined in step 212 that the maneuvers are consistent, then one or more assistance actions are suppressed (step 216). Specifically, in various embodiments, if it is determined that the vehicle movements are deemed to be consistent with (and thereby likely to be caused by) intentional driver actions and associated vehicle maneuvers, then in various embodiments the processor 142 provides instructions to block or suppress the one or more warnings or interventions that would otherwise be implemented.

In various embodiments, the process 200 then terminates at step 218.

With further reference to FIG. 2, in various embodiments, steps 210-216 may be collectively referred to herein as a subroutine 217, which will be described further below in connection with FIGS. 3-9 in accordance with exemplary embodiments.

Figure 3:
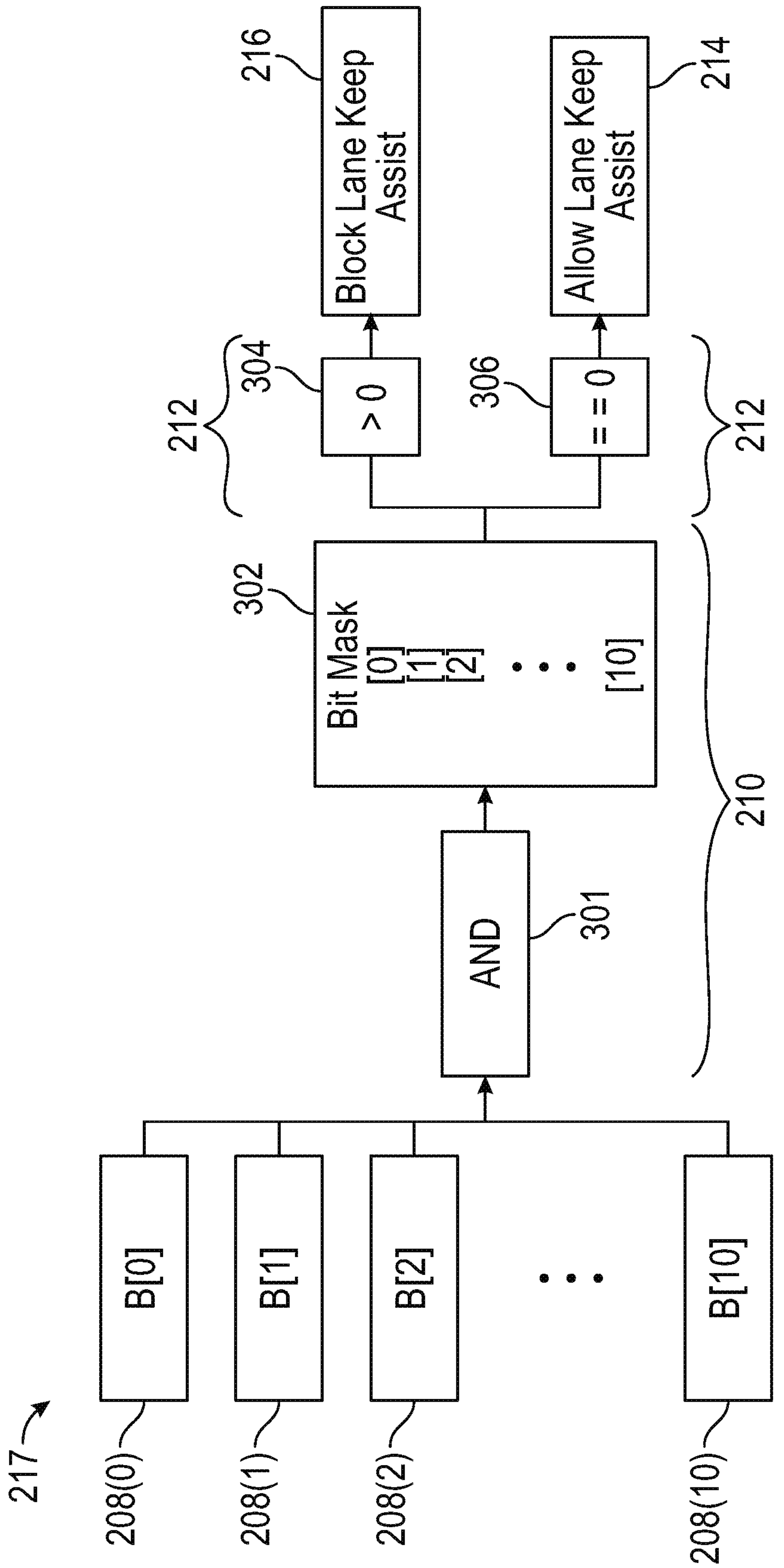
FIG. 3 is a flow diagram of a subroutine of the process of FIG. 2, in accordance with exemplary embodiments.

FIG. 3 provides an illustrative flow diagram of the subroutine 217 of FIG. 2, in accordance with an exemplary embodiment.

As depicted in FIG. 3, the subroutine 217 includes a number of different assessor functions 208(0), 208(1), 208(2), . . . , 208(10), each referring to a different assessor function of step 208 of FIG. 2 in accordance with an exemplary embodiment. While the assessor functions are labelled from zero (0) to ten (10) in FIG. 3 for illustrative purposes only, it will be appreciated that any number of different assessor functions may be implemented in various embodiments.

With reference to FIGS. 4-9, illustrative examples are provided for such different assessor functions, in accordance with exemplary embodiments.

First, FIG. 4 provides an illustration 400 of one assessor function, in which the host vehicle 100 avoids encroachment from another vehicle 401. In this example, the host vehicle 100 is travelling in a current lane 402, whereas the other vehicle 401 is travelling in an adjacent lane 404. As depicted in FIG. 4, in an exemplary embodiment the driver of the host vehicle 100 may be expected to move the host vehicle 100 to the right when the other vehicle 401 of FIG. 4 moves toward the host vehicle 100 and encroaches upon the host vehicle 100, for example as represented via a change (i.e., decrease) in the longitudinal position difference $\Delta X_L$ and the lateral position difference $\Delta Y_L$ between the respective vehicles 100, 401.

In various embodiments, the determinations of the vehicle encroachment assessor function of FIG. 4 are provided in accordance with the following equations:

$$B_L[1] = \text{abs}(\Delta X_R) < K_L\{\Delta V_{x_L}\} \,\&\&\, \Delta Y_R > K_R\{\Delta V_{y_R}\}; \quad \text{[Equation 1]}$$

and $$B_R[1] = \text{abs}(\Delta X_L) < K_L\{\Delta V_{x_L}\} \,\&\&\, \Delta Y_L < K_L\{\Delta V_{y_L}\}, \quad \text{(Equation 2)}$$

in which "K" represents a calibratable value, "X" represents respective longitudinal distances between the vehicles, "Y" represents respective lateral distances between the vehicles, "V" represents velocity, "R" represents a rightward direction, and "L" represents a leftward direction.

Next, FIG. 5 provides an illustration 500 of another assessor function, in which the host vehicle 100 overtakes one or more other vehicles 501, 502, and/or 503. In this example, the host vehicle 100 is travelling in a current lane 504 along with one of the other vehicles 501, whereas the additional other vehicles 502 and 503 are travelling in adjacent lanes 506 and 508, respectively. As depicted in FIG. 5, in an exemplary embodiment the driver of the host vehicle 100 may be expected to move the host vehicle 100 to overtake and pass one of the other vehicles 501, 502, and/or 503, for example when such other vehicles 501, 502, and/or 503 are travelling at a speed that is less than the speed of the host vehicle 100. In various embodiments, this is based on respective changes in distances: (i) between the host vehicle 100 and the other vehicle 502 in the same lane 504 (i.e., $\Delta X_{CIP}$); (ii) between the host vehicle 100 and other vehicle 502 in the left lane adjacent lane 506 (i.e., $\Delta X_L$); and (iii) between the host vehicle 100 and the other vehicle 503 in the right adjacent lane 508 (i.e., $\Delta X_R$).

In various embodiments, the determinations of the vehicle overtake assessor function of FIG. 5 are provided in accordance with the following equations:

$$B_L[0] = \Delta X_{CIP} < K_{CIP}\{\Delta V_{CIP}\} \,\&\&\, \Delta X_L > K_L\{\Delta V_L\}; \quad \text{(Equation 3)}$$

and $$B_R[0] = \Delta X_{CIP} < K_{CIP}\{\Delta V_{CIP}\} \,\&\&\, \Delta X_R > K_R\{\Delta V_R\}, \quad \text{(Equation 4)}$$

in which "K" represents a calibratable value, "X" represents respective longitudinal distances between the vehicles, "Y" represents respective lateral distances between the vehicles, "V" represents velocity, "CIP" represents the current lane of the host vehicle 100, "R" represents the right adjacent lane, and "L" represents the left adjacent lane.

Next, FIG. 6 provides an illustration 600 of another assessor function, in which the host vehicle 100 turns into a new lane on a roadway (e.g., as determined using one or more of the map databases 153 of FIG. 1). In this example, the host vehicle 100 is travelling in a current lane 602, and is approaching two new lanes of travel (namely, lane 604 and 606), namely of a freeway off-ramp into which the driver maneuvers the vehicle 100. In various embodiments, this is based on a respective change in longitudinal direction of the newly added lanes 604, 606 (i.e., $\Delta X_{LaneAdd}$).

In various embodiments, the determinations of the added lane assessor function of FIG. 6 are provided in accordance with the following equation:

$$B[2] = \Delta X_{Attach} > K\_1 \;\&\&\; \Delta X_{Detach} < K\_2 \;\&\& \text{ Host in Lane Adjacent to Added Lane,} \quad \text{(Equation 5)}$$

in which "K_1" and "K_2" represent calibratable values, "X" represents the distance from the host to the attach and detach points (e.g., such that satisfying Equation means that the host vehicle 100 is disposed between the attach and detach points).

FIG. 7 provides an illustration 700 of another assessor function, in which the host vehicle 100 is in one lane that is merging with another lane on a roadway (e.g., as determined using one or more of the map databases 153 of FIG. 1). In one such example, a host vehicle 100(1) is travelling in a current lane 702 of a highway, for which another lane 704 is merging with the current lane 702 on the highway. In another such example, a host vehicle 100(2) may instead be travelling along the lane 704 that is merging with the lane 702 of the highway. In various embodiments, this is based on respective changes in longitudinal direction of detaching from a highway lane (i.e., $\Delta X_{Detach}$) or attaching to a highway lane (i.e., $\Delta X_{Attach}$).

In various embodiments, the determinations of the merging lane assessor function of FIG. 7 are provided in accordance with the following equations:

$$B_L[3] = \Delta X_{Attach} > K\{\Delta V_X\} \quad \text{(Equation 6)}$$

and $$\Delta X_{Detach} > K\{\Delta V_X\}, \quad \text{(Equation 7)}$$

in which "K" represents a calibratable value, "X" represents a longitudinal distance with respect to the vehicle 100, "A" represents change, and "V" represents velocity.

FIG. 8 provides an illustration 800 of another assessor function, in which the host vehicle 100 is proceeding in accordance with a navigation system route. In the exemplary embodiment of FIG. 8, the host vehicle 100 is travelling in a current lane 802. As depicted in FIG. 8, a new route 804 is to be taken in accordance with a selected route of travel by the driver in accordance with a vehicle navigation system (e.g., corresponding to the location system 130 of FIG. 1 in an exemplary embodiment). In various embodiments, this is based on a change in longitudinal direction 806 (i.e., $\Delta X_{Route}$) between the new route 804 and the current lane 802.

In various embodiments, the determinations of the navigation route following assessor function of FIG. 8 are provided in accordance with the following equation:

$$B[4] = \frac{\Delta X_{Route}}{N_{Lanes_{fromRoute}}} < K\{\Delta V_x\}, \quad \text{(Equation 8)}$$

in which "K" represents a calibratable value, "X" represents a longitudinal distance with respect to the vehicle 100, "Δ" represents change, "V" represents velocity, and "N" represents a number of lanes that the vehicle 100 is currently disposed away from the desired route.

FIG. 9 provides an illustration 900 of another assessor function, in which the host vehicle 100 is currently travelling in a current lane 902 that is ending roadway (e.g., as determined using one or more of the map databases 153 of FIG. 1). In various embodiments, the end of the current lane 902 is represented by longitudinal change in distance (or position) for the end of the lane 904 a change in longitudinal direction 806 (i.e., $\Delta X_{LaneEnd}$).

In various embodiments, the determinations of the lane end assessor function of FIG. 9 are provided in accordance with the following equation:

$$B[5] = (\Delta X_{LaneEnd}) < K\{\Delta V_X\} \;\&\& \text{ Host in Ending lane,} \quad \text{[Equation 9]}$$

in which "K" represents a calibratable value, "X" represents a longitudinal distance with respect to the vehicle 100, "Δ" represents change, and "V" represents velocity.

With reference back to FIG. 3, in an exemplary embodiment each of the assessor functions (e.g., 208(0)-208(10) in an exemplary embodiment) are summed together at 301 and utilized in a bit mask technique at 302 as part of the further processing referred to above with respect to step 210 of FIG. 2. In various embodiments, a resulting bit masking value is greater than zero if any of the assessor functions are determined to be correct (that is, if the vehicle movement is deemed to be caused by an intentional maneuver by the driver relating to one of the assessor functions). Conversely, also in various embodiments, a resulting bit masking value is equal to zero if none of the assessor functions are determined to be correct (that is, if the vehicle movement is not deemed to be caused by an intentional maneuver by the driver relating to one of the assessor functions).

In various embodiments, if it is determined at 304 that the bit mask value is greater than zero (corresponding to a "yes" determination of step 212 of FIG. 2), then the process proceeds to the above-described step 216 of FIG. 2, in which warning and intervention actions are suppressed (i.e., blocked) by the processor 142.

Conversely, in various embodiments, if it is instead determined at 304 that the bit mask value is equal to zero (corresponding to a "no" determination of step 212 of FIG. 2), then the process proceeds instead to the above-described step 214 of FIG. 2, in which warning and intervention actions are provided by the processor 142.

Accordingly, methods, systems, and vehicles are disclosed for providing and suppressing warnings and interventions for vehicles with respect to vehicle movement (including with respect to lane departure warning and lane keeping assistance). In various embodiments, such warnings and interventions are provided, in accordance with instructions provided by a processor of the vehicle 100, when vehicle movements (such as vehicle draft from a center of its current lane of movement) are not determined to be caused by an intentional maneuver by the driver. Conversely, when such vehicle movements are determined to be caused by an intentional maneuver of the driver, such warnings and instructions are suppressed (e.g., blocked) by the processor of the vehicle.

It will be appreciated that the systems, vehicles, and methods may vary from those depicted in the Figures and described herein. For example, the vehicle 100 of FIG. 1, the control system 102 of FIG. 1, and/or components thereof may vary in different embodiments. It will similarly be appreciated that the steps of the process 200 may differ from that depicted in FIGS. 2 and 3, and/or that various steps of the process 200 may occur concurrently and/or in a different order than that depicted in FIGS. 2 and 3. It will also be appreciated that the implementations may differ in certain embodiments from that depicted in FIGS. 4-9.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

obtaining, via a plurality of first sensors of a vehicle, first sensor data as to movement of the vehicle from the vehicle's current path or lane, the first sensors including cameras and radars of the vehicle;

obtaining, via a plurality of second sensors of the vehicle, second sensor data as to an intended maneuver of a driver of the vehicle, the second sensors including accelerator pedal sensors, braking sensors, and steering sensors of the vehicle;

determining, via a processor of the vehicle, whether the intended maneuver of the driver is consistent with the movement of the vehicle from the vehicle's current path or lane, based on performing each of a plurality of assessors performed by the processor using the first sensor data from each of the accelerator pedal sensors, braking sensors, and steering sensors, and utilizing the second sensor data from each of the cameras and radars, including each of the following assessors:

a first assessor as to whether the driver is performing the intended maneuver for the vehicle to avoid encroachment of other vehicles;

a second assessor as to whether the driver is performing the intended maneuver for the vehicle to overtake one or more other vehicles;

a third assessor as to whether the driver is performing the intended maneuver for the vehicle to turn into a new lane on a roadway;

a fourth assessor as to whether the driver is performing the intended maneuver for the vehicle to merge with an adjacent lane;

a fifth assessor as to whether the driver is performing the intended maneuver for the vehicle to proceed in accordance with a navigation system route; and a sixth assessor as to whether the driver is performing the intended maneuver for the vehicle to move away from a lane that is ending;

providing, via instructions provided by the processor, one or more corrective actions based on the movement, when the processor determines that the intended maneuver of the driver is not consistent with the movement of the vehicle from the vehicle's current path or lane, based on each of the plurality of assessors performed by the processor; and suppressing, via the instructions provided by the processor, the one or more corrective actions, when the processor determines that the intended maneuver of the driver is consistent with the movement of the vehicle from the vehicle's current path or lane, based on each of the plurality of assessors performed by the processor;

wherein the third assessor is performed by the processor in accordance with the following equation:

$B[2]=\Delta X_{Attach}>K\_1 \ \&\& \ \Delta X_{Detach}<K\_2 \ \&\&$ Host in Lane Adjacent to Added Lane, in which "Host" represents the vehicle, "Δ" represents change, "K_1" and "K_2" represent calibratable values, "X" represents the distance from the host to attach and detach points, and such that the vehicle is disposed between the attach and detach points.

2. The method of claim 1, wherein:

wherein the step of providing the one or more corrective actions comprises providing, via the instructions provided by the processor, a warning for the driver as part of a lane departure warning functionality for the vehicle, when the processor determines, based on each of the plurality of assessors performed by the processor, that the intended maneuver of the driver is not consistent with the movement of the vehicle from the vehicle's current path or lane; and the step of suppressing the one or more corrective actions comprises not providing the warning, via the instructions provided by the processor, when the processor determines, based on each of the plurality of assessors performed by the processor, that the intended maneuver of the driver is consistent with the movement of the vehicle from the vehicle's current path or lane.

3. The method of claim 1, wherein:

wherein the step of providing the one or more corrective actions comprises providing, via the instructions provided by the processor to a steering system of the vehicle, counter-steering torque as part of a lane keeping assist functionality for the vehicle, when the processor determines, based on each of the plurality of assessors performed by the processor, that the intended maneuver of the driver is not consistent with the movement of the vehicle from the vehicle's current path or lane; and the step of suppressing the one or more corrective actions comprises not providing the counter-steering torque, via the instructions provided by the processor, when the processor determines, based on each of the plurality of assessors performed by the processor, that the intended maneuver of the driver is consistent with the movement of the vehicle from the vehicle's current path or lane.

4. The method of claim 1, further comprising:

suppressing the corrective actions, including a warning for the driver and a counter-steering torque, when the processor determines, based on each of the plurality of assessors performed by the processor, that any of the following conditions are satisfied:

an intended maneuver for avoiding one or more other detected vehicles is consistent with the movement of the vehicle from the vehicle's current path;

an intended maneuver for overtaking the one or more other detected vehicles is consistent with the movement of the vehicle from the vehicle's current path;

an intended maneuver for turning into a new lane on a roadway is consistent with the movement of the vehicle from the vehicle's current path;

an intended maneuver for merging with an adjacent lane is consistent with the movement of the vehicle from the vehicle's current path;

an intended maneuver for proceeding in accordance with a navigation system route is consistent with the movement of the vehicle from the vehicle's current path; and an intended maneuver for maneuvering from a current lane that is ending is consistent with the movement of the vehicle from the vehicle's current path.

5. A system comprising:

a plurality of first sensors of a vehicle that are configured to obtain first sensor data as to movement of the vehicle from the vehicle's current path or lane, the first sensors including cameras and radars of the vehicle;

a plurality of second sensors of the vehicle that are configured to obtain second sensor data as to an intended maneuver of a driver of the vehicle; and a processor that is coupled to the one or more first sensors and to the one or more second sensors, and that is configured to at least facilitate:

determining whether the intended maneuver of the driver is consistent with the movement of the vehicle from the vehicle's current path or lane, based on performing each of a plurality of assessors performed by the processor using the first sensor data from each of the accelerator pedal sensors, braking sensors, and steering sensors, and utilizing the second sensor data from each of the cameras and radars, including each of the following assessors:

a first assessor as to whether the driver is performing the intended maneuver for the vehicle to avoid encroachment of other vehicles;

a second assessor as to whether the driver is performing the intended maneuver for the vehicle to overtake one or more other vehicles;

a third assessor as to whether the driver is performing the intended maneuver for the vehicle to turn into a new lane on a roadway;

a fourth assessor as to whether the driver is performing the intended maneuver for the vehicle to merge with an adjacent lane;

a fifth assessor as to whether the driver is performing the intended maneuver for the vehicle to proceed in accordance with a navigation system route; and a sixth assessor as to whether the driver is performing the intended maneuver for the vehicle to move away from a lane that is ending;

providing, via instructions provided by the processor, one or more corrective actions based on the movement, when the processor determines, based on each of the plurality of assessors performed by the processor, that the intended maneuver of the driver is not consistent with the movement of the vehicle from the vehicle's current path or lane; and suppressing, via the instructions provided by the processor, the one or more corrective actions, when the processor determines, based on each of the plurality of assessors performed by the processor, that the intended maneuver of the driver is consistent with the movement of the vehicle from the vehicle's current path or lane;

wherein the processor is further configured to perform the third assessor in accordance with the following equation:

$B[2]=\Delta X_{Attach}>K\_1$ & $\Delta X_{Detach}<K\_2$ && Host in Lane Adjacent to Added Lane, in which "Host" represents the vehicle, "Δ" represents change, "K_1" and "K_2" represent calibratable values, "X" represents the distance from the host to attach and detach points, and such that the vehicle is disposed between the attach and detach points.

6. The system of claim 5, wherein the processor is further configured to at least facilitate:

providing the one or more corrective actions by providing, via the instructions provided by the processor, a warning for the driver as part of a lane departure warning functionality for the vehicle, when the processor determines, based on each of the plurality of assessors performed by the processor, that the intended maneuver of the driver is not consistent with the movement of the vehicle from the vehicle's current path or lane; and suppressing the one or more corrective actions by not providing the warning, via the instructions provided by the processor, when the processor determines, based on each of the plurality of assessors performed by the processor, that the intended maneuver of the driver is consistent with the movement of the vehicle from the vehicle's current path or lane.

7. The system of claim 5, wherein the processor is further configured to at least facilitate:

providing the one or more corrective actions by providing, via the instructions provided by the processor to a steering system of the vehicle, counter-steering torque as part of a lane keeping assist functionality for the vehicle, when the processor determines, based on each of the plurality of assessors performed by the processor, that the intended maneuver of the driver is not consistent with the movement of the vehicle from the vehicle's current path or lane; and suppressing the one or more corrective actions by not providing the counter-steering torque, via the instructions provided by the processor, when the processor determines, based on each of the plurality of assessors performed by the processor, that the intended maneuver of the driver is consistent with the movement of the vehicle from the vehicle's current path or lane.

8. The system of claim 5, wherein the processor is further configured to at least facilitate suppressing the corrective actions, including a warning for the driver and a counter-steering torque, when the processor determines, based on each of the plurality of assessors performed by the processor, that any of the following conditions are satisfied:

an intended maneuver for avoiding one or more other detected vehicles is consistent with the movement of the vehicle from the vehicle's current path;

an intended maneuver for overtaking the one or more other detected vehicles is consistent with the movement of the vehicle from the vehicle's current path;

an intended maneuver for turning into a new lane on a roadway is consistent with the movement of the vehicle from the vehicle's current path;

an intended maneuver for merging with an adjacent lane is consistent with the movement of the vehicle from the vehicle's current path;

an intended maneuver for proceeding in accordance with a navigation system route is consistent with the movement of the vehicle from the vehicle's current path; and an intended maneuver for maneuvering from a current lane that is ending is consistent with the movement of the vehicle from the vehicle's current path.

9. A vehicle comprising:

a body;

a drive system configured to move the body, the drive system including an accelerator pedal;

a steering system configured to steer the vehicle;

one or more steering sensors, accelerator pedal sensors, and braking sensors configured to obtain first sensor data as to movement of the vehicle from the vehicle's-current path or lane;

one or more radar sensors and one or more cameras configured to obtain second sensor data as to an intended maneuver of a driver of the vehicle; and a processor that is coupled to the one or more steering sensors, the one or more radar sensors, and the one or more cameras, the processor configured to at least facilitate:

determining whether the intended maneuver of the driver is consistent with the movement of the vehicle from the vehicle's current path or lane, based on performing each of a plurality of assessors performed by the processor using the first sensor data from each of the accelerator pedal sensors, braking sensors, and steering sensors, and utilizing the second sensor data from each of the cameras and radars, including each of the following assessors:

a first assessor as to whether the driver is performing the intended maneuver for the vehicle to avoid encroachment of other vehicles;

a second assessor as to whether the driver is performing the intended maneuver for the vehicle to overtake one or more other vehicles;

a third assessor as to whether the driver is performing the intended maneuver for the vehicle to turn into a new lane on a roadway;

a fourth assessor as to whether the driver is performing the intended maneuver for the vehicle to merge with an adjacent lane;

a fifth assessor as to whether the driver is performing the intended maneuver for the vehicle to proceed in accordance with a navigation system route; and a sixth assessor as to whether the driver is performing the intended maneuver for the vehicle to move away from a lane that is ending;

providing, via instructions provided by the processor, corrective actions based on the movement, including a warning for the driver as part of a lane departure warning functionality for the vehicle, and further including counter-steering torque as part of a lane keeping assist functionality for the vehicle, when the processor determines, based on each of the plurality of assessors performed by the processor, that the intended maneuver of the driver is not consistent with the movement of the vehicle from the vehicle's current path or lane; and suppressing, via the instructions provided by the processor, the corrective actions, including the warning for the driver and the counter-steering torque, when the processor determines, based on each of the plurality of assessors performed by the processor, that the intended maneuver of the driver is consistent with the movement of the vehicle from the vehicle's current path or lane;

wherein the processor is further configured to perform the third assessor in accordance with the following equation:

$B[2]=\Delta X_{Attach}>K\_1$ && $\Delta X_{Detach}<K\_2$ && Host in Lane Adjacent to Added Lane, in which "Host" represents the vehicle, "Δ" represents change, "K_1" and "K_2" represent calibratable values, "X" represents the distance from the host to attach and detach points, and such that the vehicle is disposed between the attach and detach points.

10. The vehicle of claim 9, wherein the processor is further configured to at least facilitate suppressing the corrective actions, including the warning for the driver and the counter-steering torque, when the processor determines, based on each of the plurality of assessors performed by the processor, that any of the following conditions are satisfied:

an intended maneuver for avoiding one or more other detected vehicles is consistent with the movement of the vehicle from the vehicle's current path;

an intended maneuver for overtaking the one or more other detected vehicles is consistent with the movement of the vehicle from the vehicle's current path;

an intended maneuver for turning into a new lane on a roadway is consistent with the movement of the vehicle from the vehicle's current path;

an intended maneuver for merging with an adjacent lane is consistent with the movement of the vehicle from the vehicle's current path;

an intended maneuver for proceeding in accordance with a navigation system route is consistent with the movement of the vehicle from the vehicle's current path; and an intended maneuver for maneuvering from a current lane that is ending is consistent with the movement of the vehicle from the vehicle's current path.

* * * * *